(12) United States Patent
Pan et al.

(10) Patent No.: US 8,184,095 B2
(45) Date of Patent: May 22, 2012

(54) CONTROL DEVICE

(75) Inventors: Tian-Fu Pan, Tucheng (TW);
Chung-Yueh Nien, Tucheng (TW);
Shiau-Chung Kao, Zhonghe (TW)

(73) Assignee: Liang Hsu, New Taipei (TW)

( * ) Notice: Subject to any disclaimer, the term of this patent is extended or adjusted under 35 U.S.C. 154(b) by 0 days.

(21) Appl. No.: 12/945,279

(22) Filed: Nov. 12, 2010

(65) Prior Publication Data

US 2012/0063114 A1 Mar. 15, 2012

(30) Foreign Application Priority Data

Sep. 15, 2010 (TW) ................................ 99217850 U

(51) Int. Cl.
*G06F 3/033* (2006.01)
(52) U.S. Cl. ........ 345/156; 345/111; 345/157; 345/168; 345/184; 361/679.01; 361/679.18; 361/807
(58) Field of Classification Search .................. 361/809, 361/679.08–679.2, 679.02, 600, 810; 455/37; 345/111, 156, 157, 160, 168, 184
See application file for complete search history.

(56) References Cited

U.S. PATENT DOCUMENTS

| | | | | |
|---|---|---|---|---|
| 4,724,715 A * | 2/1988 | Culver | ........................ | 74/471 R |
| 4,896,554 A * | 1/1990 | Culver | ..................... | 74/471 XY |
| 5,126,723 A * | 6/1992 | Long et al. | ..................... | 345/157 |
| 5,164,712 A * | 11/1992 | Niitsuma | ....................... | 345/184 |
| 5,818,427 A * | 10/1998 | Stromberg | ..................... | 345/163 |
| 5,883,718 A * | 3/1999 | Shu-Ming | ..................... | 356/614 |
| 6,266,046 B1 * | 7/2001 | Arita | .............................. | 345/156 |
| 6,300,938 B1 * | 10/2001 | Culver | .......................... | 345/156 |
| 6,337,680 B1 * | 1/2002 | Hamaji | ......................... | 345/157 |
| 7,091,950 B2 * | 8/2006 | Rosenberg et al. | ............ | 345/161 |
| 7,199,792 B2 * | 4/2007 | Wang | ............................. | 345/184 |
| 7,212,099 B2 * | 5/2007 | Zhai | ............................... | 340/5.6 |
| 7,501,813 B2 * | 3/2009 | Suzuki et al. | ............. | 324/207.26 |
| 2004/0190805 A1 * | 9/2004 | Ersoy et al. | .................... | 384/448 |
| 2011/0018798 A1 * | 1/2011 | Chiang | .......................... | 345/157 |

* cited by examiner

*Primary Examiner* — Angel R Estrada
*Assistant Examiner* — Dimary Lopez
(74) *Attorney, Agent, or Firm* — Kirton McConkie; Evan R. Witt

(57) ABSTRACT

A control device includes a housing, a control module having a movable member mounted in the housing and movable by the user and having a magnet located on each of the two distal ends thereof, and a circuit module that includes a microprocessor, a rotation sensor module electrically connected to the microprocessor and adapted for sensing rotation of the movable member or a sleeve on the movable member and producing a respective control signal, and a magnetic sensor module electrically connected to the microprocessor and adapted for sensing the strength of the magnetic field emitted by each magnet indicative of the direction and amount of a linear displacement of the movable member and producing a respective control signal. Subject to non-contact sensing design, the control device avoids any mechanical fatigue or contact failure.

15 Claims, 11 Drawing Sheets

CONTROL DEVICE

This application claims the priority benefit of Taiwan patent application number 099217850, filed on Sep. 15, 2010.

BACKGROUND OF THE INVENTION

1. Field of the Invention

The present invention relates to cursor control technology and more particularly, to a control device, which employs a non-contact sensing technique to detect a linear displacement of a movable member by sensing the change of the strength of the magnetic field emitted by a magnet at one of the two ends of the movable member, avoiding any mechanical fatigue or contact failure.

2. Description of the Related Art

Following fast development of the modern technology and electronic industry, many different kinds of consumer electronics, such as computer, mobile telephone, digital camera, personal digital assistant, multimedia player and etc., have entered into our daily life. Nowadays, computer has become an important tool and is intensively used by people daily. Further, following the development and popularization of home and office networks, people can use the internet to search information, listen to music, watch movies and TV news, play on-line games, send and receive e-mails, make on-line shopping, on-line subscription and on-line payment.

Further, a computer has multiple functions, bringing convenience to the user. Further, a computer may be equipped with a keyboard and/or mouse for controlling a cursor on a display screen for menu item selection, cursor dragging or other operations. When operating a computer mouse, a user may rest the wrist of the hand on the desk or a mouse pad and then move the computer mouse or click the button of the computer mouse with the fingers. However, when going to move the computer mouse over a big area, the user must lift the wrist from the desk or mouse pad. Excessive or improper use of a computer may cause pain in the wrist (the so-called carpal tunnel syndrome). In order to eliminate this problem, wrist rests are created. A wrist rest is a device used to support the wrist while typing or when using a computer mouse. However, leaning the wrists on a wrist rest for long periods can put a lot of pressure on the undersides of the wrists. This may cause carpal tunnel syndrome to develop. Actually, a wrist rest does help align the user's hands and wrists while mousing. Further, an improperly used wrist rest may actually cause more repetitive stress injuries for those who mouse for extended periods of time.

To avoid wrist injury, a wrist pad may be used. However, when operating a mouse, the user may lift the hand from the wrist pad to move the mouse, lowering the practicability of the wrist pad. Therefore, computer manufacturers are trying hard to create orthopedically engineered computers and computer peripheral devices. FIG. 11 illustrates a cursor control device for computer according to the prior art. According to this design, a rolling bar is provided for rotating by the user to control the cursor. However, the rolling bar is not movable axially to trigger a control switch. An extra swivel member may be used and drivable by the rolling bar to trigger a control switch. However, in actual application, the swivel member may be not accurately driven to trigger the control switch due to user operating habit or insufficient applied force. In this case, the user may have to operate the rolling bar repeatedly. To ensure accurate trigger, the user may have to apply much pressure to the rolling bar in driving the swivel member to trigger the control switch. Frequently operating the control device in this manner may damage the swivel member easily. When the swivel member fails, a repair work will be necessary.

Therefore, it is desirable to provide an orthopedically engineered control device that eliminates the aforesaid problems.

SUMMARY OF THE INVENTION

The present invention has been accomplished under the circumstances in view. It is one object of the present invention to provide a control device, which comprises a housing, a control module having a movable member mounted in the housing and movable by the user and having a magnet located on each of the two distal ends thereof, and a circuit module that includes a microprocessor, a rotation sensor module electrically connected to the microprocessor and adapted for sensing rotation of the movable member or a sleeve on the movable member and producing a respective control signal, and a magnetic sensor module electrically connected to the microprocessor and adapted for sensing the strength of the magnetic field emitted by each magnet indicative of the direction and amount of a linear displacement of the movable member and producing a respective control signal. Subject to the use of the magnetic sensor module to detect the change of the strength of the magnetic field without direct contact and to produce a corresponding control signal when the strength of the sensed magnetic field surpasses a predetermined value, no any mechanical fatigue or contact failure will be occurred, and therefore the invention assures high sensing accuracy and high control accuracy. Further, subject to this non-contact sensing design, the magnetic sensor module can be made of a hard, soft or flexible material, such as metal, rubber, plastics, wood, Teflon or cloth, without any limitation.

Further, the magnetic sensor module comprises a circuit board, a comparator, a magnetic sensing circuit, a latch and an output terminal. The component parts of the magnetic sensor module are installed in the circuit board, saving much installation space. As only a limited number of electronic component parts is installed in the circuit board and no any extra space is necessary for mechanical operation, the circuit module requires less installation space.

DETAILED DESCRIPTION OF THE PREFERRED EMBODIMENT

Figure 1:
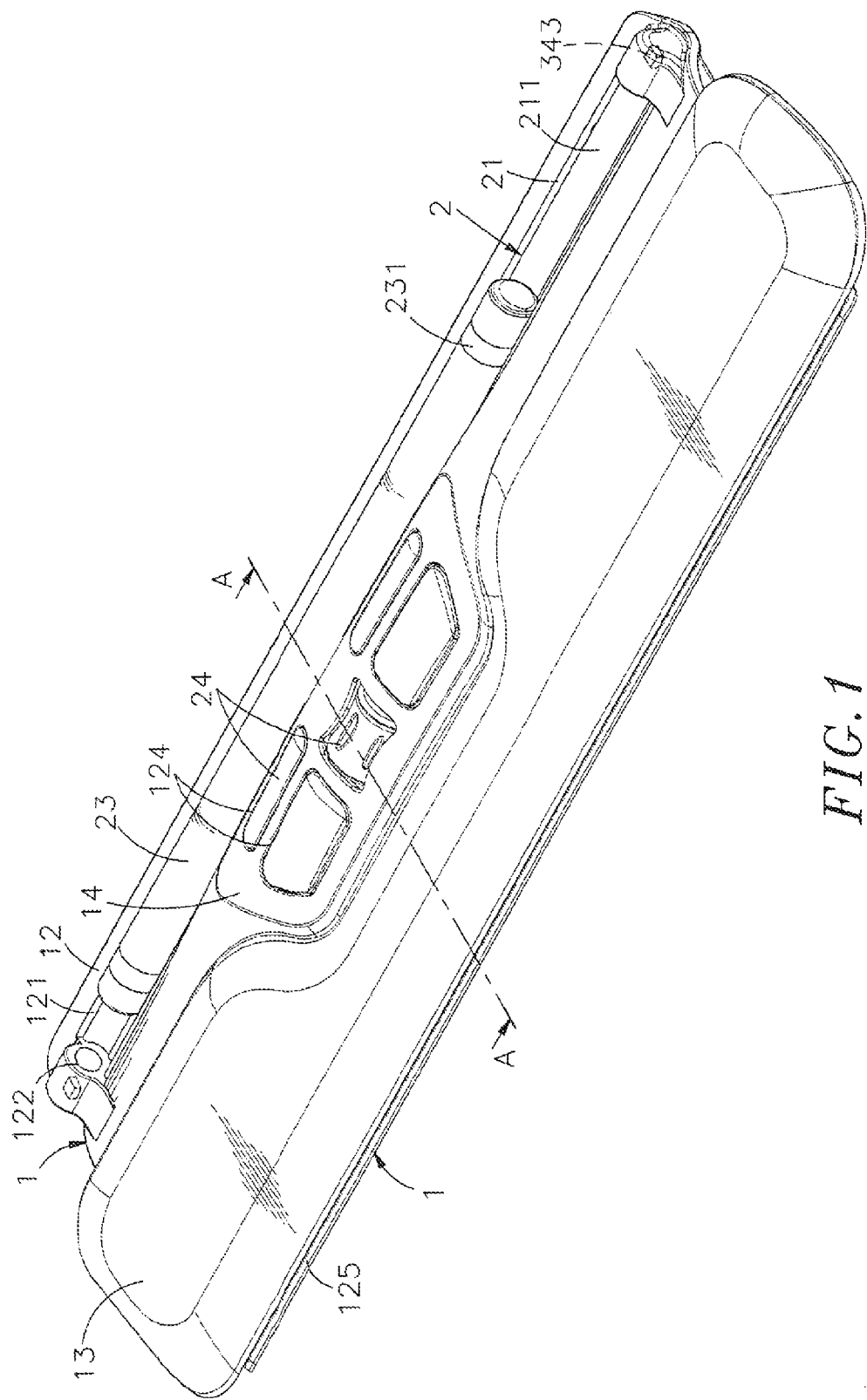
FIG. 1 is an elevational view of a control device in accordance with the present invention.
Figure 2:
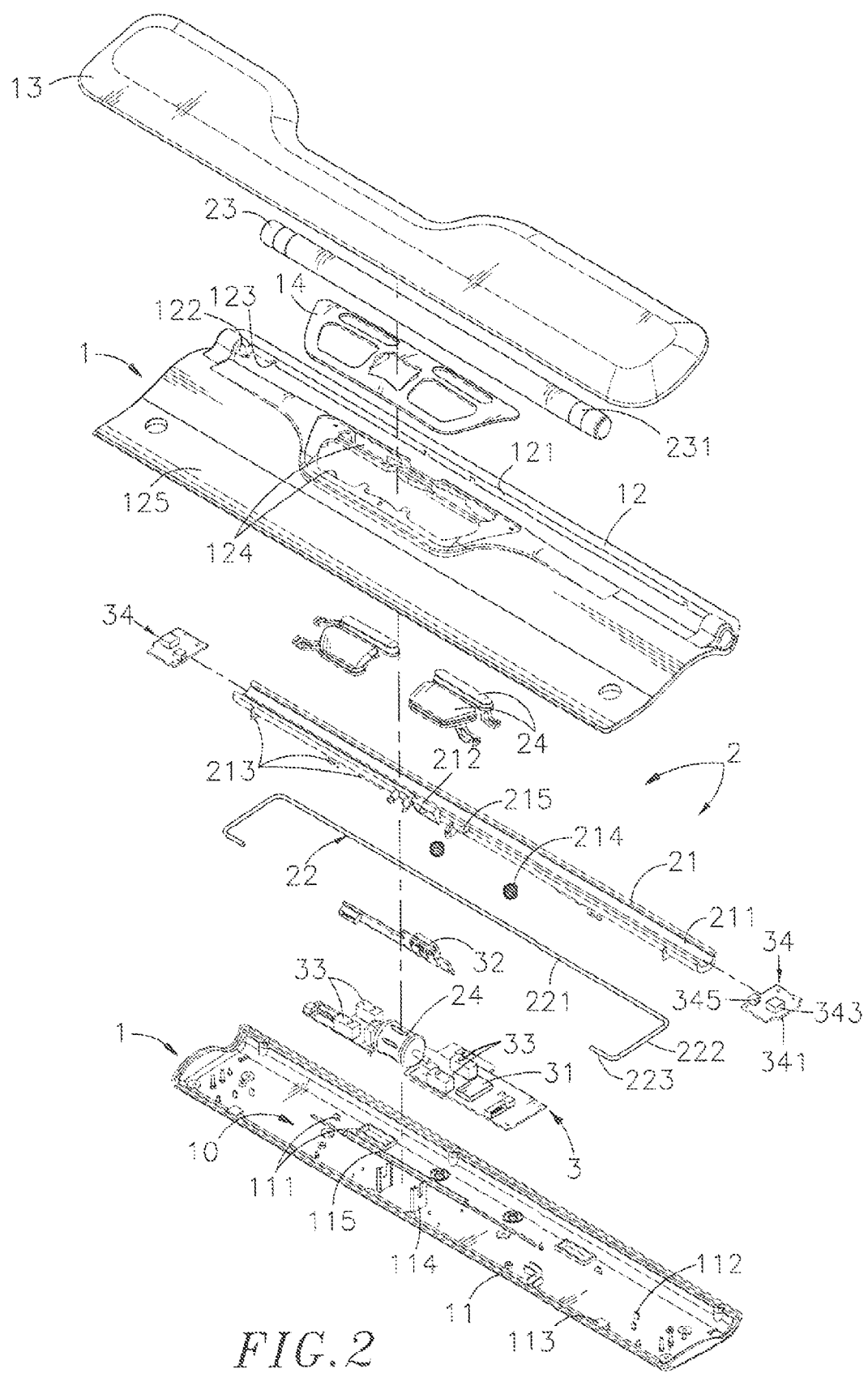
FIG. 2 is an exploded view of the control device in accordance with the present invention.
Figure 3:
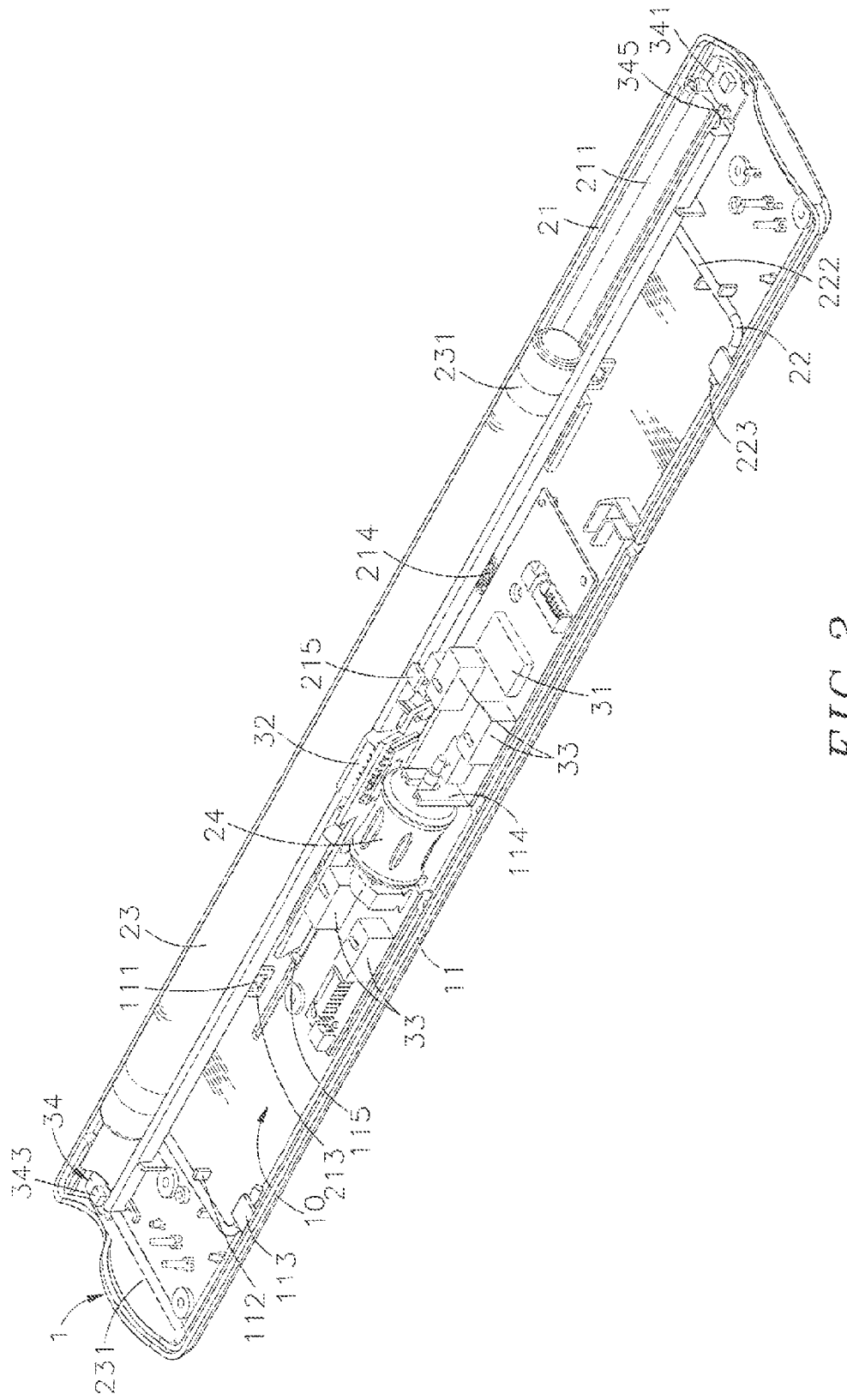
FIG. 3 is another elevational view of the control device in accordance with the present invention after removal of the second cover shell.

Referring to FIGS. 1, 2 and 3, a control device in accordance with the present invention is shown comprising a housing 1, a control module 2 and a circuit module 3.

The housing 1 comprises a first cover shell 11, a second cover shell 12 covered on the first cover shell 11 and an accommodation chamber 10 defined in between the first cover shell 11 and the second cover shell 12. The first cover shell 11 comprises a plurality of limiters 111 protruded from the top wall near the rear side thereof and suspending in the accommodation chamber 10, a plurality of pivot holders 113 symmetrically bilaterally protruded from the top wall near the front side thereof and suspending in the accommodation chamber 10, a plurality of locating blocks 112 symmetrically bilaterally protruded from the top wall thereof on the middle between the limiters 111 and the pivot holders 113, two upright pivot lugs 114 vertically upwardly extended from the top wall thereof on the middle between the locating blocks 112 and the pivot holders 113, and a recessed portion 115 located on the top wall thereof between the limiters 111 and the upright pivot lugs 114. The second cover shell 12 comprises a plurality of openings 121 corresponding to the limiters 111 disposed near the rear side thereof, two receiving grooves 122 disposed at two opposite lateral sides relative to the openings 121 in communication with the accommodation chamber 10, a plurality of limiters 123 respectively located on the front and rear sides relative to the openings 121, a plurality of slots 124 corresponding to the upright pivot lugs 114, a wrist rest 125 located on the front side thereof, a cushion pad 13 made of a soft or elastic material and fastened to the wrist rest 125 and a decorative plate 14 fastened to the top wall thereof around the slots 124.

The control module 2 comprises a carrier frame 21, a balance bar 22, a movable member 23 and a plurality of operating members 24. The carrier frame 21 is accommodated in the openings 121 and partially extended to the inside of the accommodation chamber 10, comprising a movable member groove 211 disposed outside the accommodation chamber 10 and adapted for accommodating the movable member 23, a through hole 212 in communication between the movable member groove 211 and the accommodation chamber 10, a plurality of coupling lugs 213 respectively coupled to the limiters 111 of the first cover shell 11 for enabling the carrier frame 21 to be moved up and down relative to the housing 1, a plurality of elastic members 214, a press portion 215 and a plurality of bottom hooks 216. The balance bar 22 is made of a wire rod, comprising a narrow elongated base portion 221 rotatably coupled to the bottom hooks 216 of the carrier frame 21, two side arm portions 222 respectively perpendicularly extended from the two distal ends of the narrow elongated base portion 221 in a parallel manner and respectively coupled to the locating blocks 112, and two end tips 223 respectively perpendicularly extended from the distal ends of the side arm portions 222 remote from the narrow elongated base portion 221 and respectively pivotally coupled to the pivot holders 113. The movable member 23 is rotatably and axially slidably accommodated in the movable member groove 211 of the carrier frame 21, having a magnet 231 located on each of the two distal ends thereof. The operating members 24 are respectively mounted in the slots 124 of the second cover shell 12 and exposed to the outside of the housing 1 for operation by a user.

The circuit module 3 comprises a microprocessor 31, a rotation sensor module 32 mounted in the through hole 212 of the carrier frame 21 at an outer side relative to the movable member groove 211 and electrically connected to the microprocessor 31 and adapted for sensing rotation of the movable member 23 in the movable member groove 211, a plurality of control switches 33 electrically connected to the microprocessor 31 and respectively kept in contact with the press portion 215 of the carrier frame 21 and the operating members 24, a magnetic sensor module 34 mounted in the accommodation chamber 10 at the two distal ends of the movable member groove 211 and electrically connected to the microprocessor 31 and adapted for sensing approach of one magnet 231 of the movable member 23 in a non-contact manner and producing a corresponding signal, and a connecting interface 35 electrically connected to the microprocessor 31 and electrically connectable to a communication port 41 of a computer 4. The connecting interface 35 can be a USB, PS2 or any of a variety of other commercial electrical connection means.

Further, instead of the design of consisting of a first cover shell 11 and a second cover shell 12, the housing 1 can be a single-piece member having an accommodation chamber 10 defined therein and a plurality of openings 121 in communication with the accommodation chamber 10 for the mounting of the carrier frame 21 to carry the movable member 23.

Figure 4:
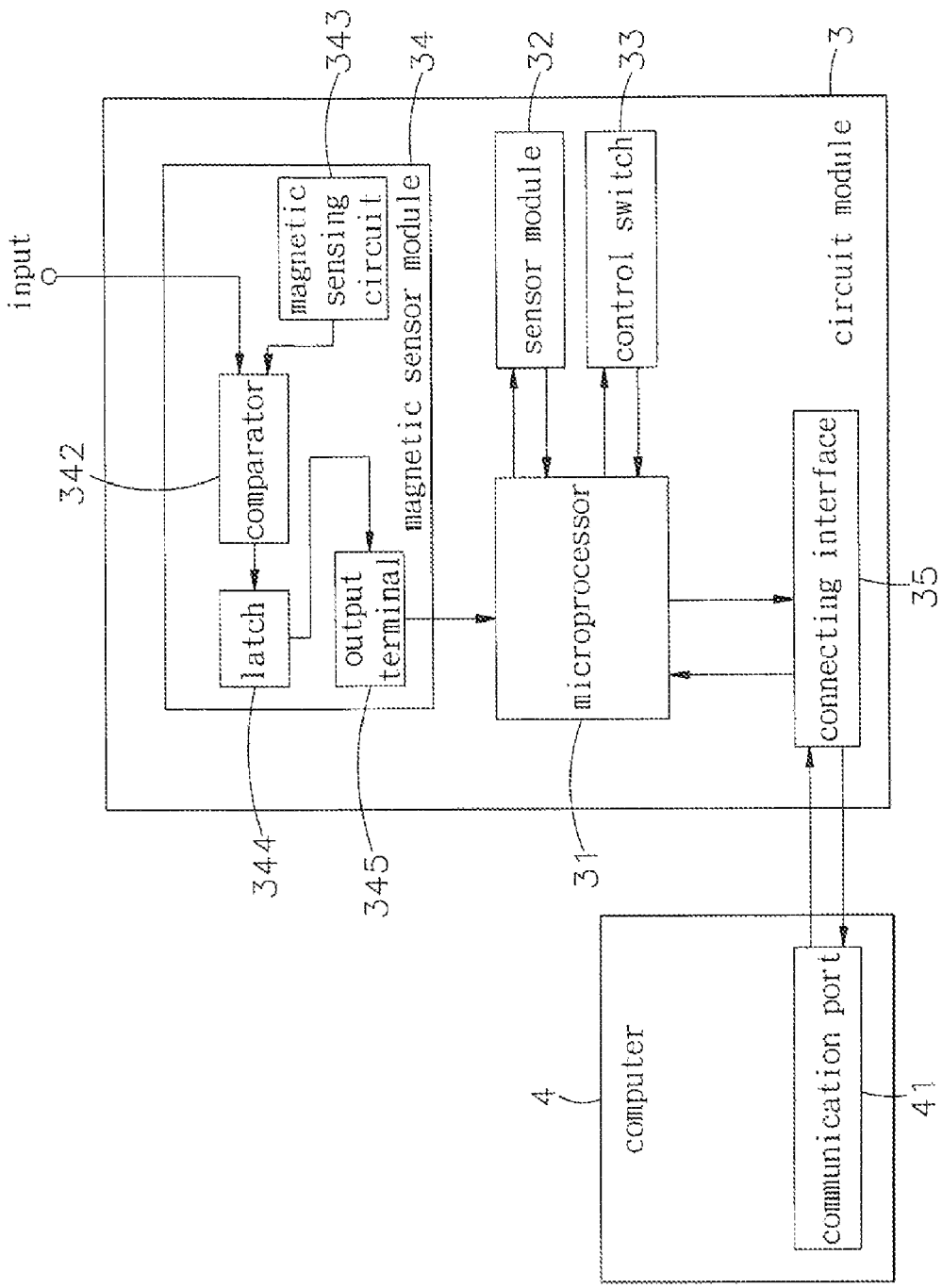
FIG. 4 is a circuit block diagram of the circuit module of the control device in accordance with the present invention.
Figure 9:
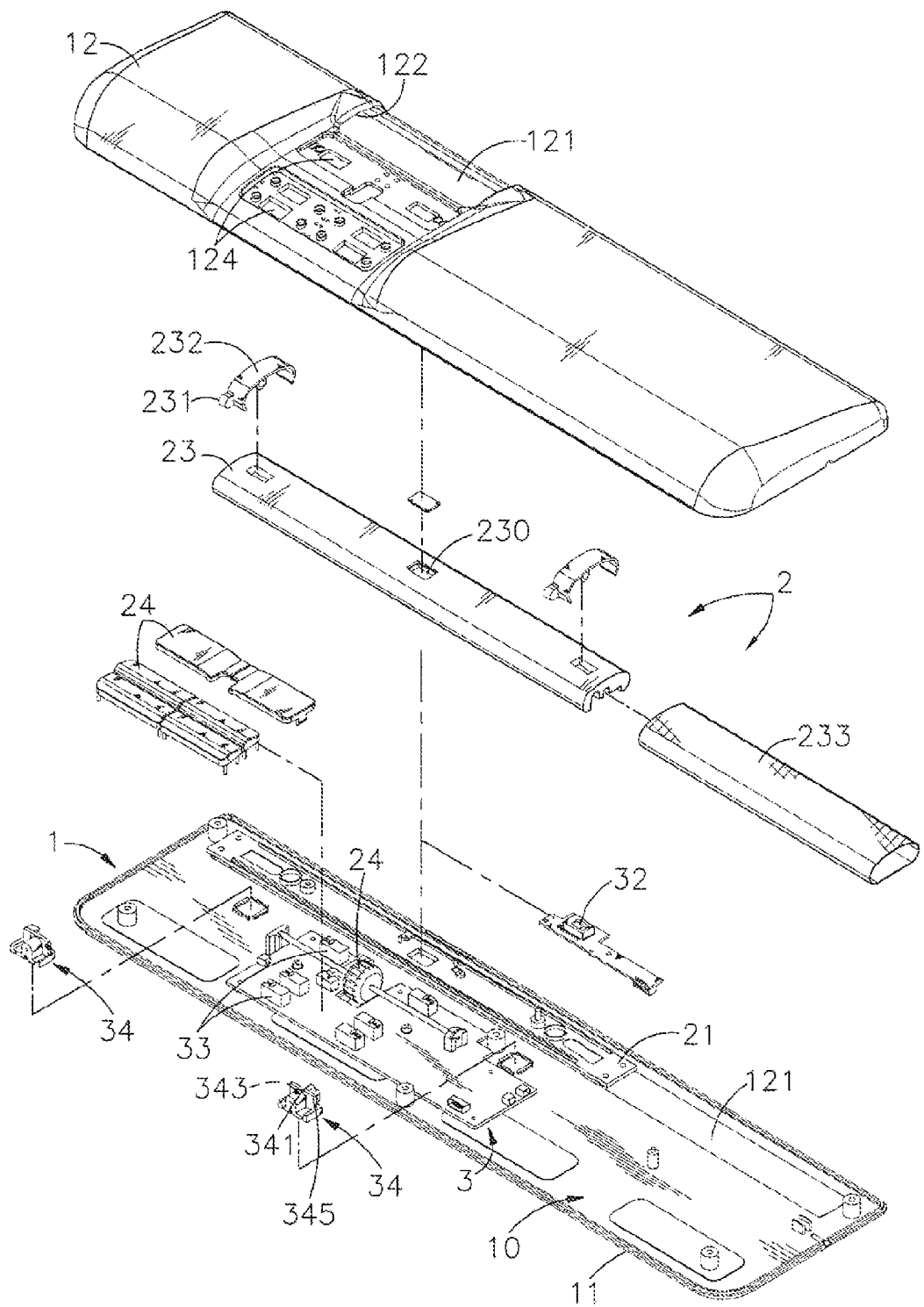
FIG. 9 is an exploded view of another alternate form of the control device in accordance with the present invention.

Referring to FIGS. 4 and 9 and FIG. 2 again, the magnetic sensor module 34 comprises a circuit board 341, a comparator 342 installed in the circuit board 341 and having a first input terminal (not shown) electrically connected to an external power source for the input of an electric current, a second input terminal and an output terminal, a magnetic sensing circuit 343 set in the moving path of the magnets 231 and electrically connected to the second input terminal of the comparator 342, a latch 344 installed in the circuit board 341 and electrically connected to the output terminal of the comparator 342, and an output terminal 345 electrically connecting the latch 344 to the microprocessor 31. As only a limited number of electronic component parts is installed in the circuit board 341 and no any extra space is necessary for mechanical operation, the circuit module 3 requires less installation space. After a long operation of the magnetic sensor module 34, no any mechanical fatigue or contact failure will be occurred, assuring sensing accuracy.

Further, the magnetic sensing circuit 343 can be a Hall IC or MR (magneto-resistive) sensor. If a Hall IC is used for the magnetic sensing circuit 343, the magnetic pole of each magnet 231 must be accurately aimed at the center of the Hall IC. If a MR (magneto-resistive) sensor is used for the magnetic sensing circuit 343, each magnet 231 must be biased sideways at a predetermined distance, for example, 2 ~2.5 mm when aiming the magnetic pole of each magnet 231 at the MR (magneto-resistive) sensor.

Figure 5:
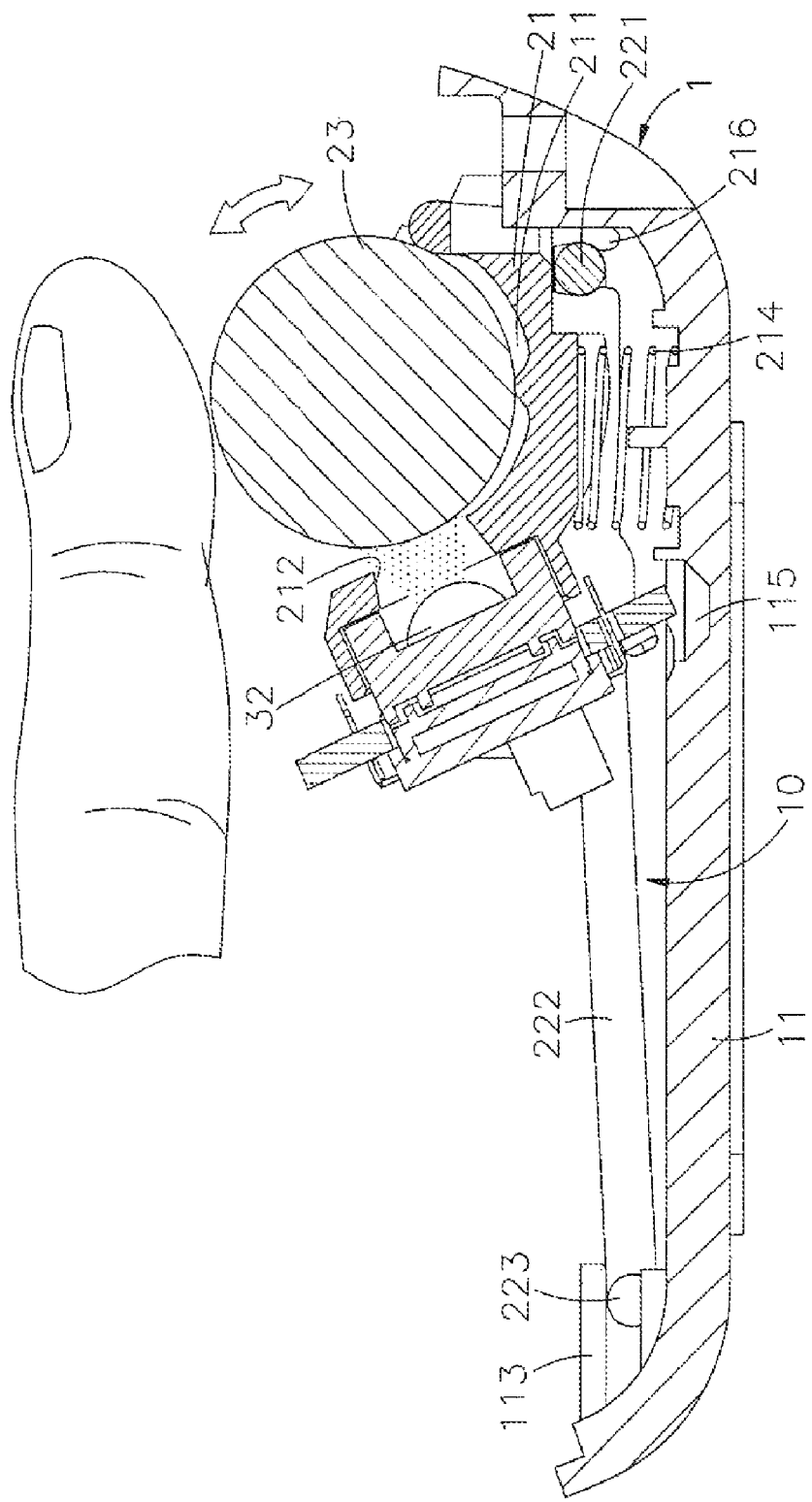
FIG. 5 is a schematic sectional side view of the present invention illustrating the movable member rotated in the carrier frame.
Figure 6:
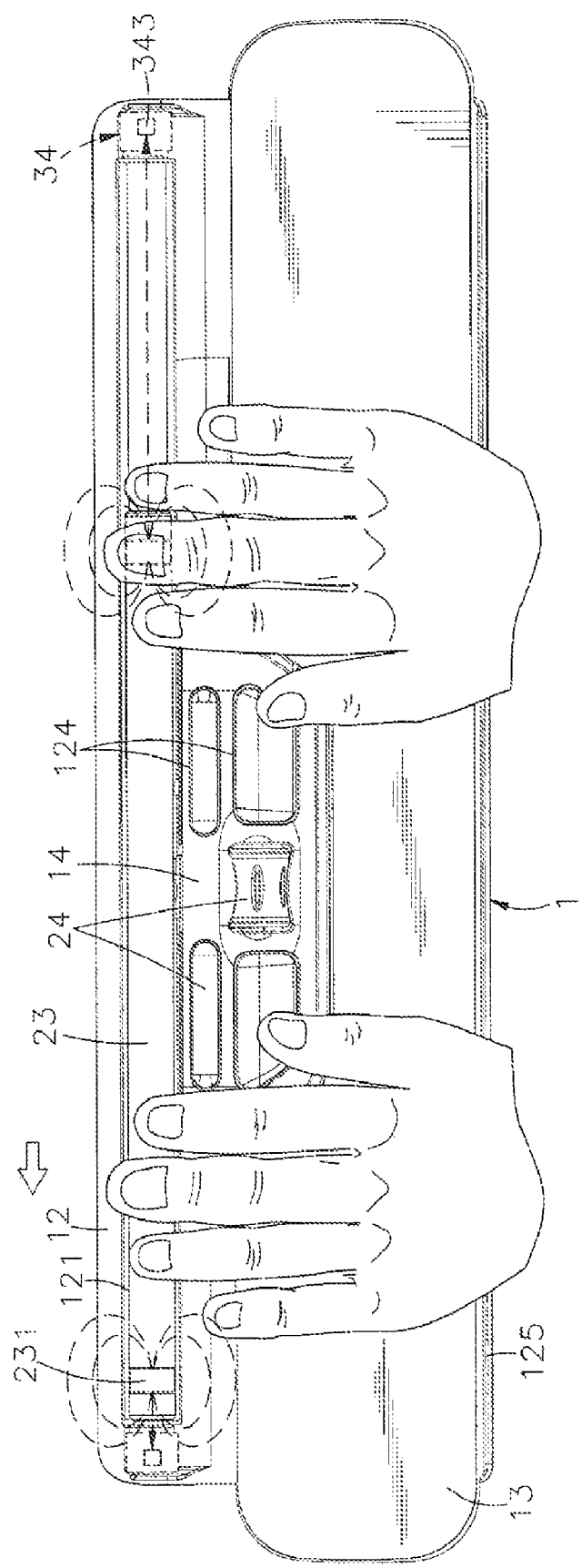
FIG. 6 is a schematic drawing of the present invention illustrating the movable member moved axially leftwards in the carrier frame.

Referring to FIGS. 5 and 6 and FIGS. 2 and 3 again, when using the control device, the user can rest the wrists on the cushion pad 13 and operate the operating members 24 and the movable member 23 with the fingers. The movable member 23 can be rotated in the movable member groove 211 clockwise or counter-clockwise by the user. When the user rotates the movable member 23 in the movable member groove 211, the rotation sensor module 32 of the circuit module 3 senses the direction and amount of rotation of the movable member 23 and provides a corresponding control signal to the computer 4 to move the cursor up/down on the display screen of the computer 4. Further, the length of the movable member 23 is shorter than the length of the movable member groove 211.

Thus, the user can slide the movable member 23 axially leftwards or rightwards in the movable member groove 211. When moving the movable member 23 axially in the movable member groove 211 toward one receiving groove 122, the magnetic sensor module 34 senses an enhanced strength of the magnetic field emitted by the respective magnet 231, i.e., the strength of the magnetic field sensed by the magnetic sensor module 34 is changed subject to variation of distance between the respective magnet 231 and the magnetic sensor module 34. After the strength of the magnetic field sensed by the magnetic sensor module 34 has surpassed a predetermined value, the magnetic sensor module 34 outputs a corresponding control signal to the computer 4 to move the cursor leftwards/rightwards on the display screen of the computer 4 subject to the sensed strength of the magnetic field that is indicative of the distance between the respective magnet 231 and the magnetic sensor module 34. Because the magnetic field of the respective magnet 231 attenuates at a very low speed and because the electronic component parts of the magnetic sensor module 34 achieve highs sensing accuracy, the magnetic sensor module 34 effectively senses the sliding movement of the movable member 23 in the movable member groove 211 and outputs a respective control signal accurately.

Figure 7:
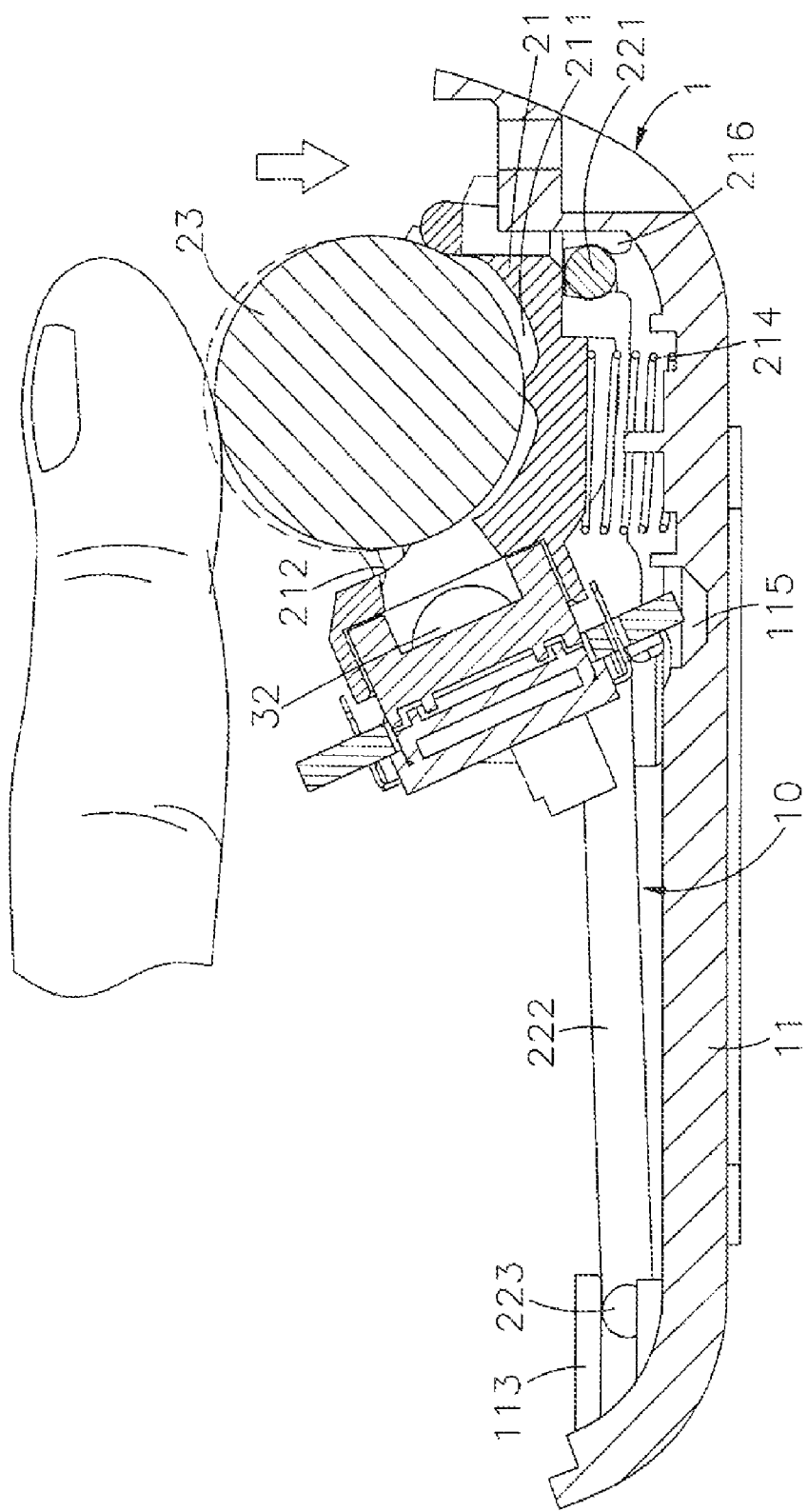
FIG. 7 is a schematic sectional side view of the present invention illustrating the movable member pressed downwards.

Referring to FIG. 7 and FIGS. 2 and 3 again, when using the control device, the user can press down the movable member 23 to lower the carrier frame 21 relative to the housing 1. Subject to the coupling effect between the coupling lugs 213 and the limiters 111;123 of the first and second cover shells 11;12, the carrier frame 21 is forced downwardly to compress the elastic members 214, at the same time the press portion 215 is forced against the associating control switch 33 to produce a cursor-click signal. The rotation sensor module 32 is installed in the carrier frame 21 at one side. During downward displacement of the carrier frame 21, the rotation sensor module 32 keeps sensing the motion of the movable member 23 in the movable member groove 211. Thus, the user can press down and slide the movable member 23 to drag or click the cursor. When released the pressure from the movable member 23, the elastic members 214 immediately return the carrier frame 21 upwardly to its former position subject to functioning between the coupling lugs 213 and the limiters 111;123 of the first and second cover shells 11;12.

Because the rotation sensor module 32 is installed in the carrier frame 21 at one side but not mounted on the bottom side of the carrier frame 21, it will be moved into the recessed portion 115 when the carrier frame 21 is forced downwards. Thus, the accommodation chamber 10 simply only needs to accommodate the coupling lugs 213, the elastic members 214, the bottom hooks 216 and the balance bar 22 for allowing the carrier frame 21 to move up and down. Therefore, the vertical height of the housing 1 can be minimized. Further, because the through hole 212 of the carrier frame 21 is disposed at one side relative to the movable member groove 211 but not at the bottom side of the carrier frame 21, outside dust will not enter the inside of the housing 1 through the through hole 212 to contaminate the rotation sensor module 32 of the circuit module 3, assuring constant sensing accuracy of the rotation sensor module 32.

As stated above, the movable member 23 is slidable axially leftwards and rightwards in the movable member groove 211 of the carrier frame 21. When the user presses down the movable member 23, the pressure may be applied to the movable member 23 at a location deviated from the mid point of the movable member 23, causing the movable member 23 and the carrier frame 21 to tilt. This problem is eliminated subject to the functioning of the balance bar 22. As stated above, the end tips 223 of the balance bar 22 are respectively pivotally coupled to the pivot holders 113 of the first cover shell 11. When the carrier frame 21 is moved downwards, the balance bar 22 is biased to keep the carrier frame 21 in balance. Further, if the carrier frame 21 is made of a flexible material (such as plastics or rubber), the carrier frame 21 may be unable to keep straight due to its elongated configuration. This problem is eliminated subject to the use of the balance bar 22. Because the elongated base portion 221 of the balance bar 22 rotatably coupled to the bottom hooks 216 of the carrier frame 21, the balance bar 22 gives support to the carrier frame 21, keeping the carrier frame 21 in shape and facilitating rotation and axial movement of the movable member 23 in the movable member groove 211.

Referring to FIGS. 1, 2, 3 and 6 again, because the movable member groove 211 of the carrier frame 21 is exposed to the openings 121 of the second cover shell 12 and the length of the movable member 23 is shorter than the movable member groove 211, the user can pick up the movable member 23 from the carrier frame 21 directly with the hand for cleaning if the movable member 23 is contaminated or covered with dust or any other impurities. Further, the movable member 23 can be made of any of a variety of materials of different specific gravities to fit different users.

Figure 8:
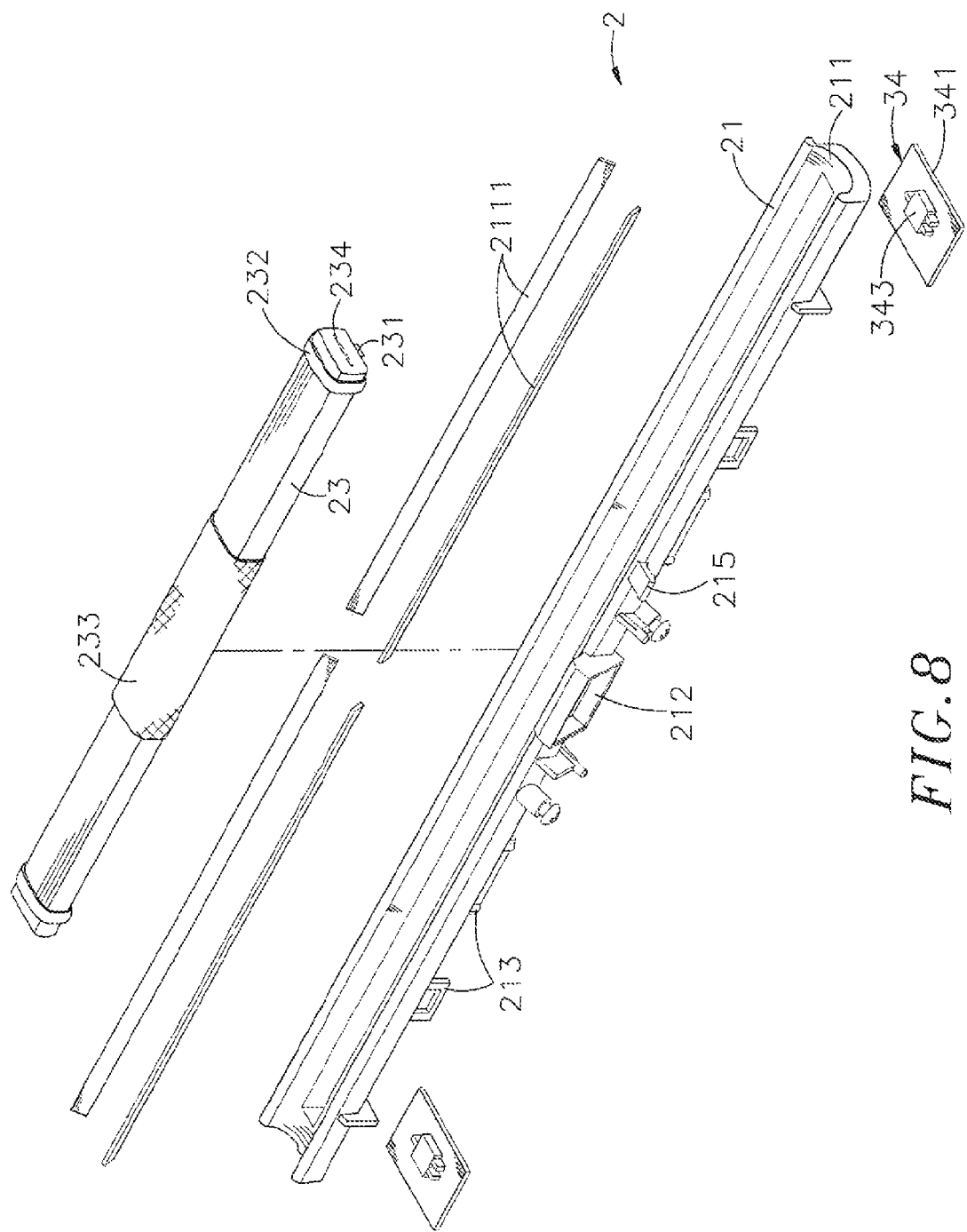
FIG. 8 is an exploded view of present invention, illustrating an alternate form of the control module.

Referring to FIG. 8 and FIGS. 2 and 3 again, because the movable member 23 is rotatably and axially slidably accommodated in the movable member groove 211 of the carrier frame 21, a friction resistance may be produced between the movable member 23 and the carrier frame 21 when the user moves or rotates the movable member 23 in the movable member groove 211. To avoid this problem, the movable member 23 is preferably made of polyoxymethylene (POM), polytetrafluoroethylene (PTFE), or any of a variety of other self-lubricating materials for the advantage of low friction resistance and high stability. Further, slide-assisting members 2111 may be mounted in the movable member groove 211 at two sides to assist sliding motion of the movable member 23 in the movable member groove 211. The slide-assisting members 2111 can be strip members made of unsaturated polyester (UPE) or polytetrafluoroethylene (PTFE), or ball members made of ruby, ceramic or wear resistant material. Subject to the aforesaid measures, the movable member 23 can be rotated or moved in the movable member groove 211 smoothly with less effort.

Further, the movable member 23 can be a solid member. Alternatively, the movable member 23 can be a hollow member having an axial slot 234. Different stuffing means may be selectively filled in the axial slot 234 to change the weight of the movable member 23.

Figure 10:
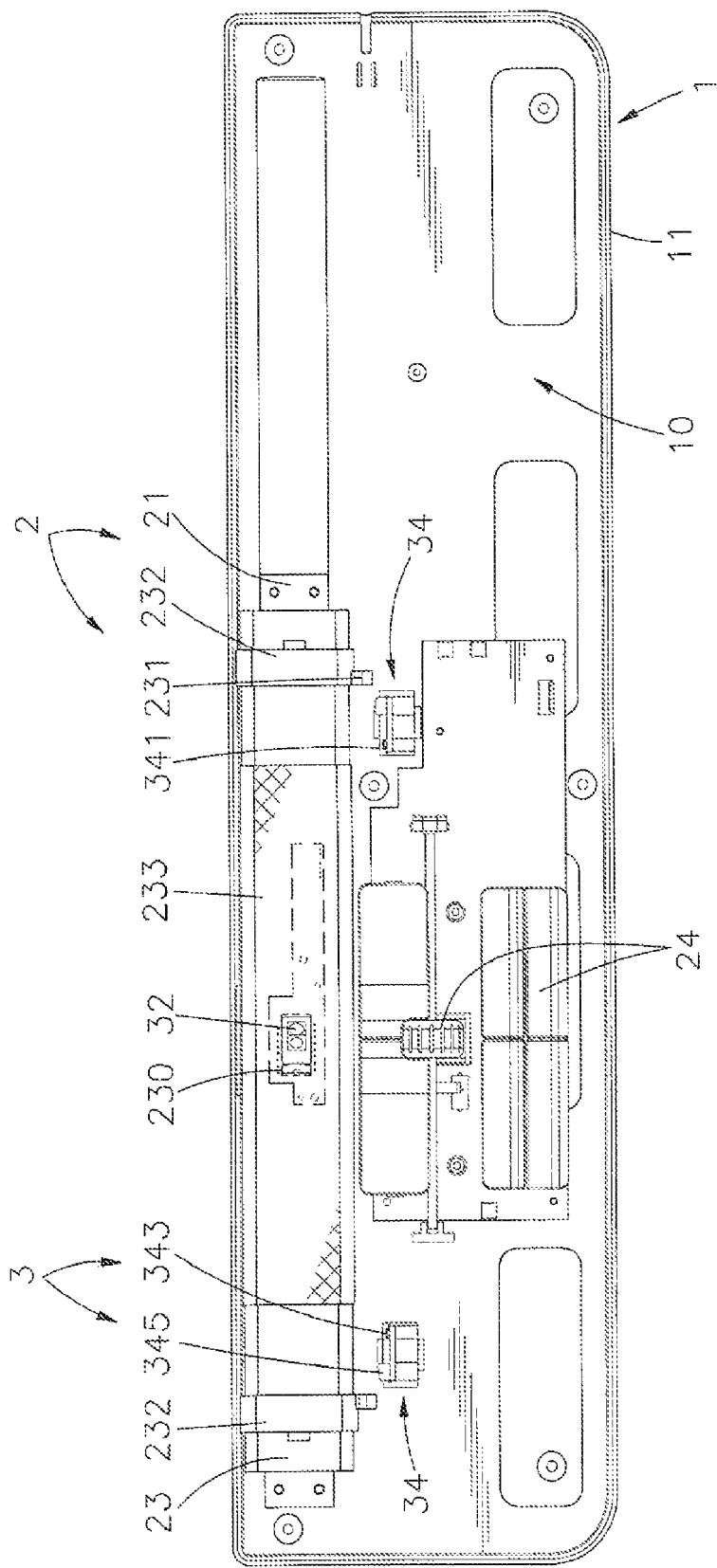
FIG. 10 is a schematic top view of the control device shown in FIG. 9.
Figure 11:
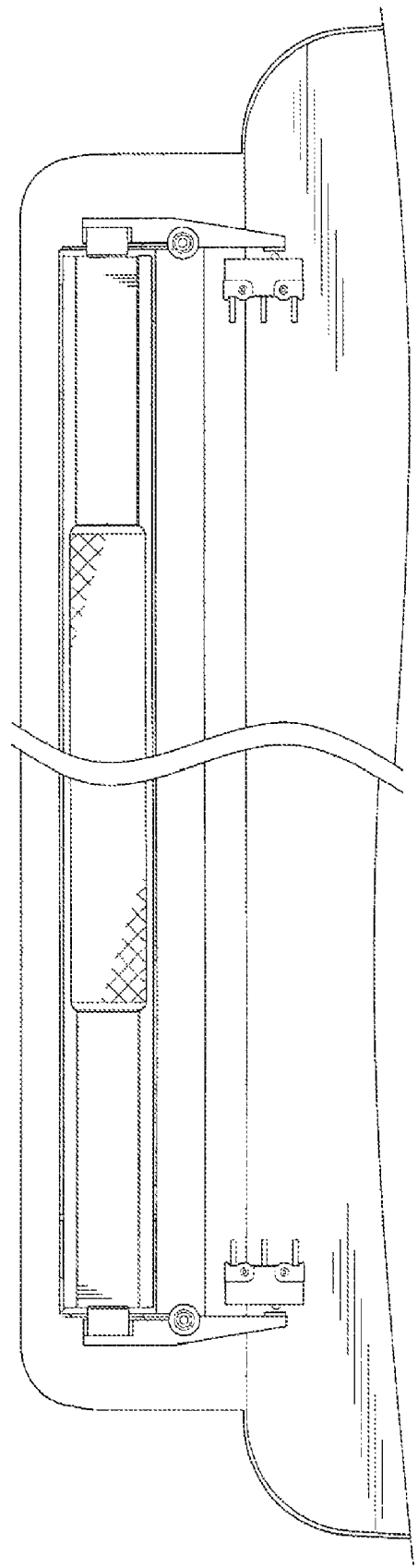
FIG. 11 is a schematic top view of a control device according to the prior art.

Referring to FIGS. 9 and 10, the carrier frame 21 of the control module 2 is mounted in the accommodation chamber 10 of the housing 1 below the opening 121, and the movable member 23 is accommodated in the carrier frame 21 and exposed to the opening 121. According to this embodiment, the movable member is an elongated bar having a hollow bottom side and supported with its front and back sides on the carrier frame 21. Further, the left and right ends, i.e., the two distal ends of the movable member 23 are respectively inserted into the receiving grooves 122 at the left and right sides of the opening 121. Further, the movable member 23 comprises a through hole 230 vertically cut through the top and bottom sides thereof on the middle, a sleeve 233 sleeved thereon, a magnet holder 232 located on each of the two distal ends thereof to hold one respective magnet 231. Further, the sleeve 233 surrounds the movable member 23 and the carrier frame 21. Further, each magnet 231 can be arranged to protrude over the respective end of the movable member 23. Alternatively, each magnet 231 can be arranged to project into the inside of the movable member 23. Further, the rotation sensor 32 is mounted in the carrier frame 21 and aimed at the through hole 230 to sense rotation of the sleeve 233 relative to the movable member 23.

During application, the user can slide the movable member 23 in the carrier frame 21 toward the left or right side, causing the magnetic sensor module 34 to sense the change of the strength of the magnetic field and to produce a signal indicative of axial displacement of the movable member 23 in the carrier frame 21. At the same time, the user can rotate the sleeve 233, causing the rotation sensor module 32 to sense the amount and direction of rotation of the sleeve 233 relative to the carrier frame 21 and to produce a corresponding signal.

Referring to FIGS. 2, 3, 8 and 9, the magnets 231 and the movable member 23 can be made in integrity by insert molding. Alternatively, the magnets 231 can be fastened to the movable member 23 by adhesion, snap means or welding. Alternatively, magnet holders 232 can be respectively mounted on the two distal ends of the movable member 23 to hold one respective magnet 231. Each magnetic holder 232 can be made having a magnet mounting hole for accommodating one respective magnet 231. Further, the movable member 23 can be made in the shape of a cylindrical bar, rectangular bar, oval bar or pentagonal bar, or in the shape of a narrow, elongated, rectangular or arched cover. If the movable member 23 is made in the form of a cylindrical bar that is rotatable in the carrier frame 23, the sleeve 233 is unnecessary. If the movable member 23 is not rotatable in the carrier frame 23, the sleeve 233 is necessary and rotatable relative to the movable member 23.

Further, the movable member 23 can be made of any of a variety of materials, such as metal, rubber, plastics, wood, Teflon, or cloth. By means of operating the movable member 23 to move the magnets 231, the magnetic sensor module 34 accurately senses the change of the strength of the magnetic field indicative of the axial displacement of the movable member 23 in the carrier frame 21.

Referring to FIGS. 2 and 3 again, the operating members 24 are respectively mounted in the slots 124 and exposed to the top side of the housing 1 for operation by the user. Each operating member 24 can be a button, roller, rolling ball, or any finger-operable member operable by the user to trigger the associating control switch 33 of the circuit module 3 in controlling the cursor.

In conclusion, the control device of the present invention has the advantages and features as follows:

1. When sliding the movable member 23 leftwards or rightwards, the magnet 231 at one end of the movable member 23 is moved toward the magnetic sensor module 34, causing the magnetic sensor module 34 to detect the change of the strength of the magnetic field without direct contact and to produce a corresponding control signal when the strength of the sensed magnetic field surpasses a predetermined value. Because no any mechanical fatigue or contact failure will be occurred, the invention assures high sensing accuracy and high control accuracy.
2. The magnetic sensor module 34 senses the change of the strength of the magnetic field subject to the change of the distance between the magnets 231 and the magnetic sensor module 34 without direct contact. Thus, the magnetic sensor module 34 can be made of a hard, soft or flexible material, such as metal, rubber, plastics, wood, Teflon or cloth, without any limitation.
3. The comparator 342, magnetic sensing circuit 343, latch 344 and output terminal 345 of the magnetic sensor module 34 are installed in the circuit board 341. As only a limited number of electronic component parts is installed in the circuit board 341 and no any extra space is necessary for mechanical operation, the circuit module 3 requires less installation space.

As stated above, the control device of the invention is characterized in that a movable member 23 is movably disposed in an accommodation chamber 10 inside a housing 1 and exposed to an opening or opening 121 of the housing 1 and carrying a magnet 231 at each of the two distal ends thereof, and a magnetic sensor 34 is mounted inside the housing 1 to sense the change of the strength of the magnetic field of each magnet 231 without direct contact and to produce a control signal indicative of the movement of the movable member 23, avoiding any mechanical fatigue or contact failure problem.

A prototype of control device has been constructed with the features of FIGS. 1~10. The control device functions smoothly to provide all of the features disclosed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A control device, comprising:
 a housing, said housing defining an accommodation chamber and at least one opening in communication between said accommodation chamber and the space outside said housing;
 a control module, said control module comprising a movable member movable relative to the at least one opening of said housing, said movable member comprising a magnet located on each of two distal ends thereof; and
 a circuit module mounted in said accommodation chamber inside said housing, said circuit module comprising a microprocessor, a rotation sensor module electrically connected to said microprocessor and adapted for sensing rotation of at least one part of said movable member relative to said housing and producing a respective control signal, and a magnetic sensor module electrically connected to said microprocessor and adapted for sensing the strength of the magnetic field emitted by each said magnet of said movable member indicative of the direction and amount of a linear displacement of said movable member relative to said housing and producing a respective control signal.

2. The control device as claimed in claim 1, wherein said housing is formed of a plurality of cover shells.

3. The control device as claimed in claim 1, wherein said control module further comprises a carrier frame mounted in said at least one opening and partially extending to the inside of said accommodation chamber, said carrier frame comprising a movable member groove disposed outside said accommodation chamber and adapted for accommodating said movable member and a through hole in communication between said movable member groove and said accommodation chamber; said rotation sensor module is mounted in said through hole of said carrier frame at an outer side remote from said movable member groove.

4. The control device as claimed in claim 3, wherein said control module further comprises a balance bar pivotally mounted in said accommodation chamber and pivotally coupled to said carrier frame to support said carrier frame in balance; said control module further comprises a plurality of elastic members mounted on a bottom side of said carrier frame opposite to said movable member groove and stopped against a part of said housing inside said accommodation chamber.

5. The control device as claimed in claim 1, wherein said housing further comprises two receiving grooves respectively disposed in said accommodation chamber at two opposite sides; said control module further comprises a carrier frame mounted in said at least one opening and partially extending to the inside of said accommodation chamber and a sleeve sleeved onto said carrier frame and rotatable relative to said carrier frame, said carrier frame comprising a movable member groove connected between said receiving grooves of said housing; said movable member is movably accommodated in said movable member groove, having the two distal ends thereof respectively inserted into said receiving grooves and a through hole in communication between said movable member groove and said accommodation chamber and surrounded by said sleeve for enabling said rotation sensor module to sense rotation of said sleeve relative to said housing.

6. The control device as claimed in claim 1, wherein said carrier frame comprises a press portion disposed outside said movable member groove; said circuit module further comprises a control switch electrically connected to said microprocessor for triggering by said press portion when said movable member is pressed by a person to lower said carrier frame.

7. The control device as claimed in claim 1, wherein said movable member comprises an axial slot for the filling of a filling material to change the weight of said movable member.

8. The control device as claimed in claim 1, wherein said circuit module further comprises a connecting interface electrically connected to said microprocessor and electrically connectable to a communication port of an external computer, said connecting interface being selected from the group of USB and PS2.

9. The control device as claimed in claim 1, wherein said movable member and said magnets are molded together by insert molding.

10. The control device as claimed in claim 1, wherein said magnets are fastened to the two distal ends of said movable member by one of the fastening techniques of adhesion, snap means and welding.

11. The control device as claimed in claim 1, wherein said movable member comprises two magnet holders respectively located on the two distal ends thereof to hold one associating magnet.

12. The control device as claimed in claim 1, wherein said movable member is made in one of the shapes of a cylindrical bar, a oval bar, a rectangular bar and a pentagonal bar.

13. The control device as claimed in claim 1, wherein said magnetic sensor module comprises a comparator, said comparator having a first input terminal electrically connected to an external power source for electric current input, a second input terminal and an output terminal, a magnetic sensing circuit electrically connected to the second input terminal of said comparator and disposed in the moving path of said magnets and adapted for sensing movement of said magnets, a latch electrically connected to the output terminal of said comparator, and an output interface electrically connecting said latch to said microprocessor for transmitting a signal from said latch to said microprocessor.

14. The control device as claimed in claim 13, wherein said magnetic sensing circuit is a MR (magneto-resistive) sensor; said magnets have the poles thereof aimed at an outer side of said magnetic sensing circuit.

15. The control device as claimed in claim 13, wherein said magnetic sensing circuit is a Hall IC; said magnets have the poles thereof aimed at the center of said Hall IC.

* * * * *